Nov. 17, 1931.  J. P. TARBOX  1,832,433
BALANCING SYSTEM FOR AIRCRAFT
Filed Jan. 29, 1929  2 Sheets-Sheet 1
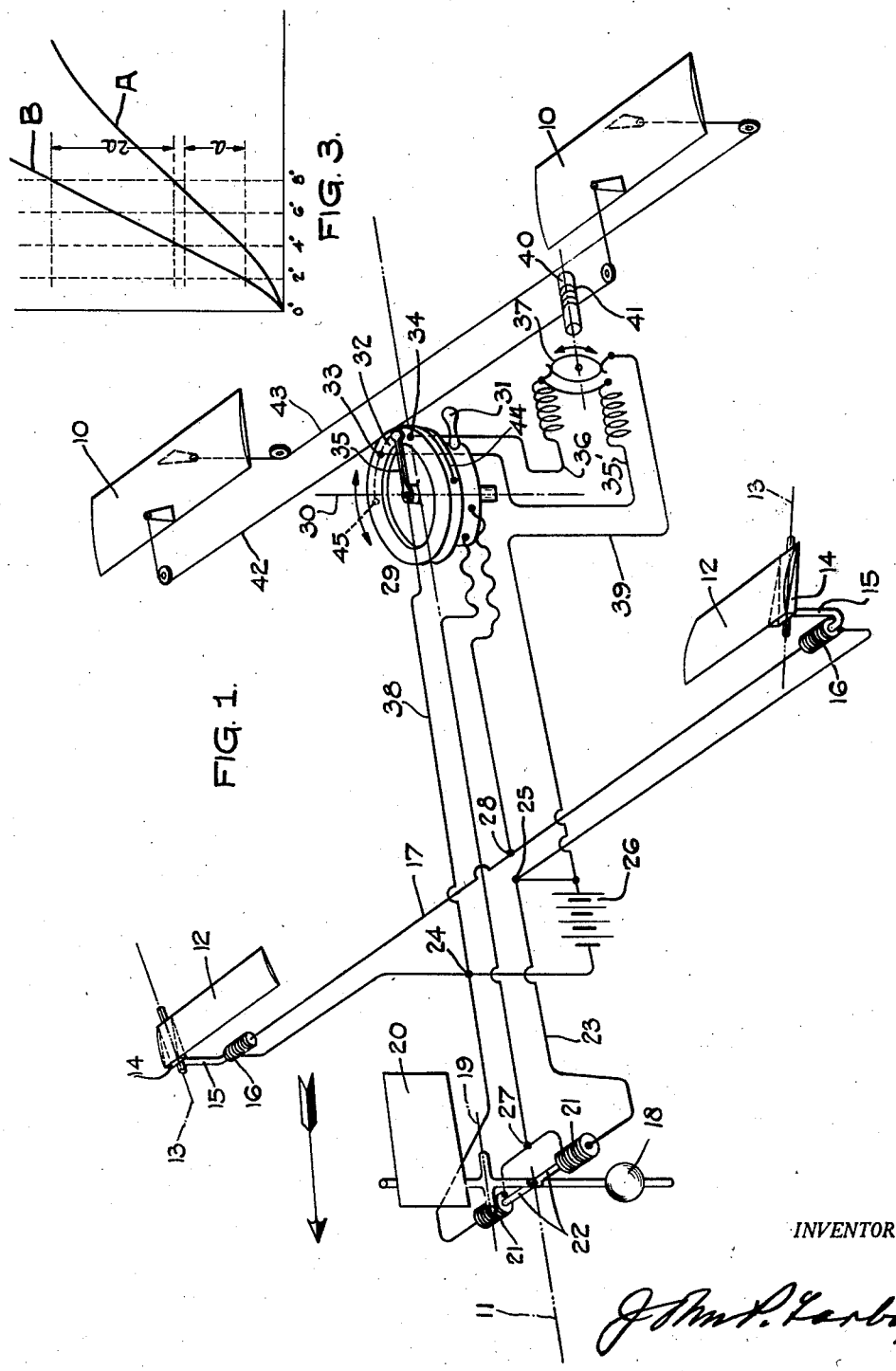
INVENTOR.
John P. Tarbox

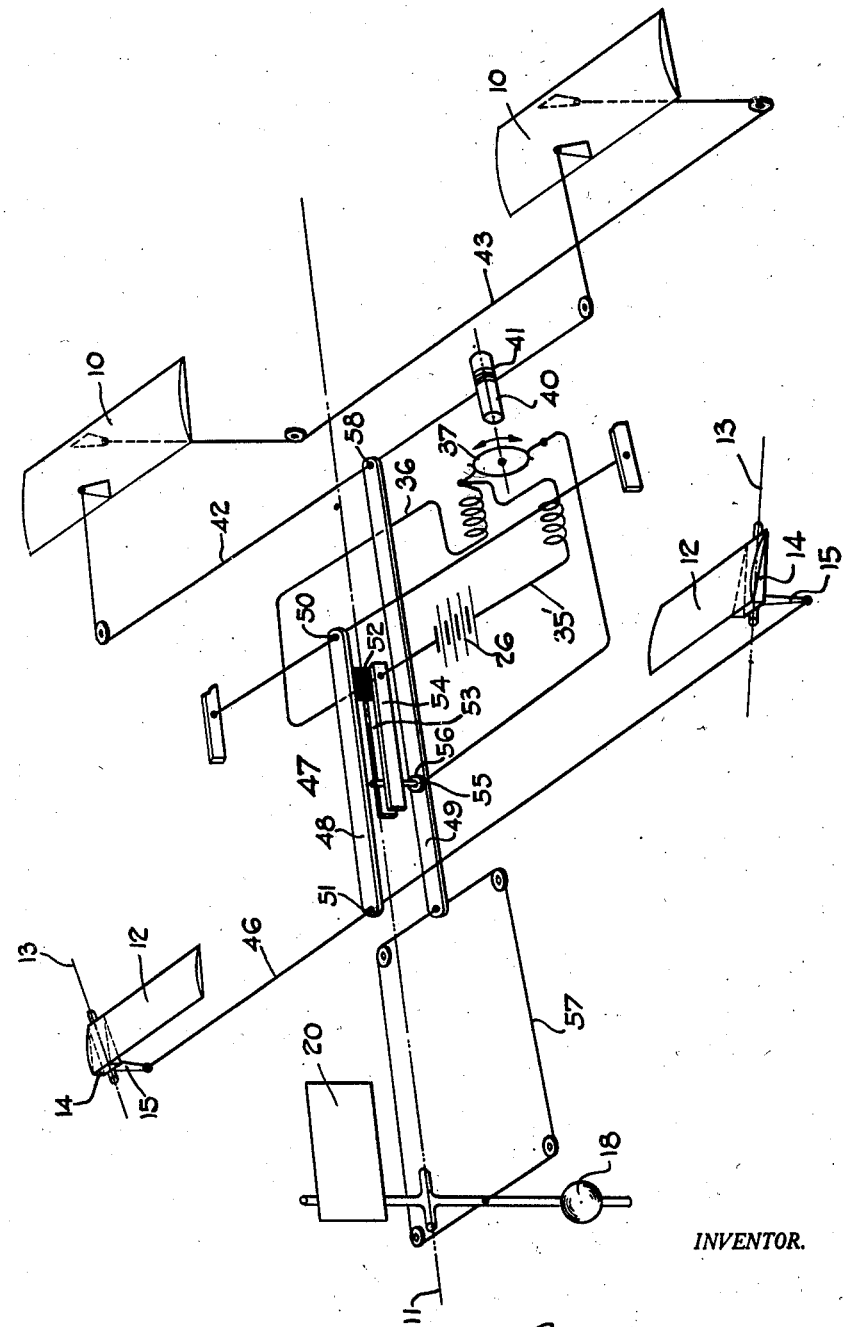

Patented Nov. 17, 1931

1,832,433

UNITED STATES PATENT OFFICE

JOHN P. TARBOX, OF PHILADELPHIA, PENNSYLVANIA

BALANCING SYSTEM FOR AIRCRAFT

Application filed January 29, 1929. Serial No. 335,777.

The improvement of my present invention is directed especially to the securing of a maximum celerity of response of pilot devices of whatever description and obtaining a maximum differential celerity of response over the aircraft to be balanced in favor of the pilot device. In other words, the prime aim is to secure operation of the pilot devices so far in advance of material response of the craft to be balanced to unbalancing conditions as possible. Thereby the pre-setting of the balancing devices to offset the unbalancing of the craft by the unbalancing conditions to which the pilot devices respond, is guaranteed.

Devices and systems have heretofore been devised by me with a view to furthering such conditions, but the present system furthers them to a considerably greater extent than prior such systems.

In the main, it may be stated that I attain these objects by the utilization of a balancing rudder and a pilot operating system therefor which pilot operating system at large is characterized by a greater ratio of pilot controlling moment to aggregate pilot resistance than the ratio of aircraft unbalancing moment to aggregate aircraft resistance to unbalancing. More specifically speaking, I utilize an aerofoil pilot control surface having a greater rate of controlling coefficient change than the rate or lift coefficient change of aerofoil section. Further, I make the moment of inertia per unit of control force of the pilot control surface so small as possible, considerably less than the moment of inertia per unit of the average affected area of the aerofoil surface of the aircraft. Still further, I so arrange the pilot control surfaces that a given pilot force is the most rapidly developed into the maximum controlling power.

In the accompanying drawings I show two forms of my invention, the one diagrammatically shown in Fig. 1, an electrical embodiment, the other diagrammatically shown in Fig. 2, a mechanical embodiment, while Fig. 3 is a diagram of the curves of the controlling co-efficients.

Consider first Fig. 1. Here the lateral balancing rudders of the aircraft are designated 10. The body of the aircraft and the wings are not shown, but they are grouped symmetrically as are the ailerons 10 about the diagrammatically indicated axis 11. Pilot surfaces are also in the form af ailerons 12 located symmetrically with respect to the axis 11 and its plane of symmetry.

The pilot ailerons 12 in the form illustrated are mounted on longitudinally extended axes 13. These axes lie in a horizontal plane but converge forward toward each other as clearly appears in Fig. 1. They are thus at a dihedral angle in the horizontal plane. The ailerons 12 are set upon them at a positive angle as indicated by the intervened wedge shaped mounting blocks 14. Any suitable form of bearings whatsoever may be utilized to connect the ailerons 12 so set to the axis 13 so disposed. This showing as well as all others is intended to be mainly diagrammatic. So arranged, if upwardly deflected, an aileron 12 will have its angle of attack progressively decreased due to the angularity of its axis 13, while if the aileron be depressed, its angle of attack will be continuously increased. By making the normal angle of attack and the angle of convergence of axes 13 and 11 equal, the aileron will have zero angle of attack when moved upwardly 90° and double its angle of attack when moved downwardly 90°. By reason of this suceptibility of great movement (only partially realized in the form of Fig. 1), a relatively small controlling force differential is instantly converted into a relatively great controlling power, for a relatively small lever 15 may be utilized for the conversion of this force.

These pilot ailerons are differentially coupled together in the form of Fig. 1 through an electrical system of the form known to the art as a Wheatstone bridge. Each lever 15 exercises upon resistance 16 a variable pressure. Such resistances are well known in the arts. Edison used carbon discs or blocks in a pile in the early days of the art. Since that time many other forms have been developed possessing far greater variability per unit variation of applied pressure. Recently such units have been formed of metal discs coated with certain oxides, particularly copper oxides. They occupy but very small compass. These resistances 16 are connected at opposite ends of one branch 17 of the bridge circuit.

A standard of position 18 with respect to earth in the form of a pendulum is swung from a longitudinal axis 19 in combination with a vertical vane 20 parallel to that axis. This controls resistances 21 similar to resistances 16 through variably exercised pressure upon them through links 22 as the craft may be variously inclined laterally to the horizontal or as vane 20 may be variously acted upon by side winds under conditions of sideslip or skidding. The resistances 21 are connected in the opposite side 23 of the electrical bridge circuit. The opposite ends 24, 25 of the bridge circuit are connected to the battery 26. The middles 27—28 of the opposite sides 23—17 are connected to an indicating instrument 29.

This indicating instrument may be any suitable form of such instrument, of the galvanometer type or other. This instrument is normally fixed about an axis 30 disposed as may be desired. Or it may be angularly shifted about this axis by a manual means diagrammatically illustrated as a handle 31. When so shifted, it remains in shifted position when released and until further shifted. Annularly related to this instrument by mounting upon any sort of bearing concentric with axis 30 is a contact ring 32 preferably of insulating material and bearing opposed contacts 33—34 constituting terminals of obverse and reverse circuits 35'—36 of the controlling motor 37. Indicating pointer or arm 35 of the instrument 29, when there is no circuit passing through the instrument 29, lies mid-way between the contacts 33—34, and these contacts are closely adjacent. Depending upon the direction of passage of current through the instrument the indicating arm 25 makes contact with one or the other of contacts 33—34. The arm 35 is connected to the battery 26 by conductor 38 and the common terminal of the motor 37 also connected thereto by conductor 39. Therefore, motor 37 is operated alternately in opposite directions through the alternate closure of its obverse and reverse circuits 35'—36.

Circuits 35'—36 include independent field coils as indicated. This is a type of control of a series motor involving reversal of field and is peculiarly adaptable in that it is known to operate with a minimum of sparking and resultant oxidation and uncontrollable variation at the control points. The motor drives the drum 40 upon which are turns 41 of the control cable 42 which oppositely actuates the ailerons 10 of the aircraft. This cable 42 is supplemented by cable 43 to form a complete cable control circuit effecting positive movement of both ailerons in opposite directions. Cable 42 also makes connection with the contact ring 32, being preferably split in the middle and its opposite ends crossed in the groove 44 of the ring and tied to anchorages 45. In this manner movement of cable 42 revolves the ring 32 around axis 30 and relative to the indicating arm 35.

The aerofoil section of the wings of the aircraft (themselves not shown) is assumed to have a lift characteristic curve designated in Fig. 3 by the letter A. The aerofoil section of the pilot surfaces 12 is deliberately chosen for a characteristic showing a much greater lift co-efficient per unit change of angle of attack than the aerofoil characteristic curve A. The characteristic curve of the pilot aileron is designated B. Assuming by way of illustration a two degree change each way from a normal angle of attack from 6° down to 4° and up to 8°, it will be seen as between the two curves illustrated in A and B, co-efficient change for the aerofoil section is the quantity "$a$" while the co-efficient change for the pilot aileron is substantially twice this, to wit, "$2a$". Thus, the pilot aerofoil changes its coefficient at twice the rate of the aeroplane aerofoil section. Many other illustrations might be given but the outstanding feature of them is that the pilot aerofoil section shall have a considerably greater rate of change of control co-efficient than has the aircraft aerofoil section rate of lift co-efficient.

With this understanding the operation and the attainment of the objects of my invention will be readily comprehended. A given change of angle of attack affects ailerons 12 and the aerofoil wing surfaces substantially simultaneously, but perhaps affects the aerofoil control surfaces a fraction earlier incident to their forward location preferably in advance of the aeroplane wings. The force effect of the disturbance on the pilot surfaces is therefore magnified over and above the force effect on the aeroplane wing. Instantly this magnified force effect is translated into a magnified power effect on the relatively short lever arms 15. This gives a magnified variation of pressure on resistances 16, a differential variation as between one end of the bridge and the other. Due to the electrical character of the inter-connection, this difference is instantly measured by deflection of the indicator arm 35, and motor 37 is instantly actuated in the proper direction to instantly set ailerons 10 in a direction and to a degree to accurately offset the unbalancing force which the pilot has detected. It is scarcely to be conceived that there may be any system of inter-connection between pilot devices having, or which may have by well known expedients, a less over all resistance to controlling force transmission (by resistance in this sense is meant the summation of all elements which may oppose such transmission, including mechanical and electrical resistances of whatever form, inductive inertia or other). Proper design of instrument 35 makes its indications instantaneous. Proper design of motor 37 makes its operation instantaneous. Proper design of the circuit 42—43 renders its action instantaneous. Lightness of parts, powerful torques, directness of connections, freedom from lost motion and frictions, all of these and other factors are combined with the greater rate of change of controlling co-efficient of pilot surfaces 12 to render ratio of pilot controlling moment to aggregate pilot resistance greater than the ratio of aeroplane unbalancing moment to aggregate aeroplane resistance to unbalancing moment.

The aeroplane itself is very sluggish as compared with such a system. Its proportions are gross. Its moment of inertia including as it does the elements of the entire machine, wings, motor, body and landing gear, together with load, is large. The damping moment of its wings and associated parts is very great. The unbalancing force affects its wings over a limited relative area in many cases. The ratio of the aircraft unbalancing moment for a given change of angle of attack to aggregate aircraft resistance to unbalancing (by which is meant resistance of all sorts, those recited and others) is far less than the relatively high ratio obtainable through the combination of elements of the pilot system.

As explained in my Patent No. 1,832,334 the operations of the vane 20 and the standard of position 18 differentially supplement the operation of the pilot device 12. The pilot vane 20 pre-sets the ailerons in anticipation of unbalancing and to intially offset it. If incompletely offset due to any cause, additional angle is given the ailerons proportionately to the degree of lesser unbalancing which may have occurred, this degree being measured by the standard of position 18 with respect to earth. The vane 20 is effective through yawing action of the plane upon the institution of a turn, to bank the plane.

Any movement of ailerons 10 through cable 42 immediately affects a counter movement of the contact ring 32 which progressively dis-engages contacts 32 and 34 from the indicator 35. This constitutes an electrical follow-up device definitely proportioning the pre-setting of the ailerons 10, or any after setting, precisely to the differential indication of the arm 35. The normal setting of the instrument may at any time be regulated by the adjustment 31. Indeed, the system may be manually operated through the adjustment 31.

The system of Fig. 2 embodies the same balancing rudders 10 and pilot surfaces 12 of the same relative arrangement and the same standard 18 and vane 20. It embodies too the same operating motor 37. Other similar parts are similarly numbered. But the control connections between pilots 12, standard 18, vane 20, and motor 37 are mechanical rather than electrical. A cable 46 differentially inter-connects the levers 15 with a differential lever mechanism 47. This mechanism comprises two overlying levers 48—49. The lever 48 has one end 50 pivotally set and the other end 51 connected with cable 46 for oscillatory movement. Through an insulating block 52 it carries a pair of contacts 53—54 constituting respectively the terminals of the obverse and reverse circuits 35'—36 of the motor 37. The common terminal of motor 55 is carried by the underlying bar 49 in insulating block 56. This bar 49 has its fore end connected in cable circuit 57 oscillatable by the control elements 18 and 20, but has its rear end 58 connected to cable 42.

So organized the operation, while mechanical, is in turn similar to that of the system of Fig. 1. The magnified rate of change and controlling moment of pilots 12 is differentially measured in cable 46 with a resultant quick and relatively powerful movement of the lever 48 effecting contact with the appropriate terminals 53—54 and instant operation of the motor 37 and accompanying pre-setting of the ailerons 10. Connection 58 acts as a follow-up connection, dis-engaging the common contact 55 from the spring contacts 53 and 54 (the spring or yield is necessary to permit proper relative movement in full measure of deflection of pilot ailerons 12). Control movements of devices 18—20 actuates the fore end of the lower lever 49 but in this case, as in the case of the operation of the lever 48, contact 49 is dis-engaged from the contacts 54—53 by the follow-up connection 58 the moment the ailerons 10 are given the measured additional setting proportionately to the movements of the devices 18 and 20.

Very clearly the cable connections 57—46 may be made of a minimum inertia and of a minimum friction and of a maximum directness. Clearly also the differential devices 47 may be made very small and light yet sufficiently strong to operate the light contacts 53—54—55 which are acquired. These contacts may, of course, work through relays. This device, like all others, is diagrammatically shown and appears tremendously magnified in proportion. As a matter of fact, in the form of this invention constructed this device is only a few inches long.

Finally, the magnification of the ratios of controlling moment to aggregate resistance of pilot surfaces 12 is yet further enhanced by constructing the surfaces themselves of a less weight per unit of area than the aerofoil sections of the aircraft. This may be done in a number of ways, as for example, by making the framework of materials having the highest possible strength per unit of weight, and a covering or filler material having the minimum per unit area.

Clearly my invention is capable of many modifications other than those shown. Clearly the pilot devices themselves may take many forms without departing from the spirit of my invention. Clearly also the pilot devices may give way to balancing rudders having similar characteristics and self-operative either of themselves or through servo motors which they themselves control to effect equivalent results. These and all other modifications which fall within the generic spirit of my invention are intended to be covered in the annexed claims.

I claim:

1. An automatic balancing system for aircraft comprising a balancing rudder operated by a servo-motor and an air rush responsive pilot system for controlling said servo-motor, which pilot control system has a materially greater ratio of pilot system controlling force to aggregate pilot system resistance at all times than the ratio of aircraft unbalancing moment to aggregate aircraft resistance moment opposing unbalancing.

2. An automatic balancing system for aircraft comprising a balancing rudder operated by a servo-motor and an air rush responsive pilot aerofoil system for controlling said servo-motor, which pilot control system has a materially greater ratio of pilot system controlling force to aggregate pilot system resistance at all times than the ratio of aircraft unbalancing moment to aggregate aircraft resistance moment opposing unbalancing.

3. In combination, an airplane and an automatic balancing system therefor comprising an air rush responsive aerofoil pilot control surface mounted on the airplane, the aerofoil section of which has greater rates of lift coefficient changes at corresponding angles of incidence than the rates of lift coefficient changes of the airplane aerofoil section at its effected angles of attack during airplane unbalancing.

4. In combination, an airplane and an automatic balancing system therefor comprising an air rush responsive aerofoil pilot control surface mounted on the airplane, the aerofoil section of which has greater rates of lift coefficient changes at corresponding angles of incidence than the rates of lift coefficient changes of the airplane aerofoil section at its effected angles of attack during airplane unbalancing, and which pilot control surface also has a less moment of inertia with respect to its mounting.

5. An aircraft balancing system comprising an aerofoil pilot control surface having angular movement in the transverse vertical plane about a longitudinally extending axis inclined to the plane of symmetry of the aircraft.

6. An aircraft balancing system comprising an aerofoil pilot control surface having angular movement in the transverse vertical plane about a longitudinally extending axis lying substantially in a horizontal plane and inclined to the plane of symmetry of the aircraft.

7. An aircraft balancing system comprising a pair of pressure responsive devices located respectively at opposite extremities of the craft, a standard of position of the craft with respect to earth, a Wheatstone bridge, differential resistances on one side operated by said pressure responsive devices, and on the other side operated by said standard of position, and a bridge balance indicating instrument, together with aircraft balancing rudders connected to be controlled through indications of said instrument.

8. An aircraft balancing system comprising a pair of pressure responsive devices located respectively on opposite sides of an axis of unbalancing, a standard of position of the craft with respect to earth, electrical resistances differentially operable by said devices and standard of position respectively, connections between said resistances forming a Wheatstone bridge balanced when the pressure responsive devices and the standard of position are balanced and unbalanced when said devices and standard are unbalanced, a bridge balance responsive instrument and an aircraft balancing rudder connected to be controlled through the responses of said instrument.

9. An aircraft balancing system comprising a pair of pressure responsive devices located respectively on opposite sides of an axis of unbalancing, a standard of position of the craft with respect to earth, electrical resistances differentially operable by said devices and standard of position respectively, connections between said resistances forming a Wheatstone bridge balanced when the pressure responsive devices and the standard of position are balanced and unbalanced when said devices and standard are unbalanced, a bridge balance responsive instrument and an aircraft balancing rudder connected to be controlled through the responses of said instrument, together with a follow up connection from said balancing rudders associated with the balance responsive instrument.

10. An aircraft balancing system comprising a pair of pressure responsive devices located respectively on opposite sides of an axis of unbalancing, a standard of yawing of the craft with respect to earth, electrical resistances differentially operable by said devices and standard of yawing respectively and connections between said resistances forming a Wheatstone bridge balanced when the pressure responsive devices and the standard of yawing are balanced and unbalanced when said devices and standard are unbalanced, a bridge balance responsive instrument, and an aircraft balancing rudder connected to be controlled through the responses of said instrument.

11. An aircraft balancing system comprising a pair of pressure responsive devices located respectively on opposite sides of an axis of unbalancing, a standard of position of the craft with respect to earth, electrical resistances differentially operable by said devices and standard of position respectively and connections between said resistances forming a Wheatstone bridge balanced when the pressure responsive devices and the standard of position are balanced and unbalanced when said devices and standard are unbalanced, a bridge balance responsive instrument, and an aircraft balancing rudder connected to be controlled through the responses of said instrument, together with a standard of yawing controlling differentially resistances in said bridge.

12. An aircraft balancing system comprising a pair of pressure responsive devices located respectively on opposite sides of an axis of unbalancing, a standard of position of the craft with respect to earth, electrical resistances differentially operable by said devices and standard of position respectively and connections between said resistances forming a Wheatstone bridge balanced when the pressure responsive devices and the standard of position are balanced and unbalanced when said devices and standard are unbalanced, a bridge balance responsive instrument and aircraft balancing rudders connected to be controlled through the responses of said instrument, together with a follow up connection from said balancing rudders associated with the balance indicating instrument, and a standard of yawing controlling differentially resistances in said bridge.

13. An electrical balancing system for aircraft comprising a Wheatstone bridge and balance control pilot devices variably controlling the resistances of said bridge.

14. An electrical balancing system for aircraft comprising a Wheatstone bridge, balance control pilot devices differentially controlling the resistances of said bridge, a circuit closing indicator connected between two points of said bridge, a source of power connected between the remaining two points of said bridge, and a follow-up device operating through one point of the bridge.

In testimony whereof he hereunto affixes his signature.

JOHN P. TARBOX.